United States Patent Office 3,584,087
Patented June 8, 1971

3,584,087
PRODUCTION OF FLAKED PHOSPHATE
ESTER SALTS
Marvin Mausner, Teaneck, and Albert Benson, Fairlawn,
N.J., assignors to Witco Chemical Corporation, New
York, N.Y.
No Drawing. Filed May 2, 1968, Ser. No. 726,200
Int. Cl. C07f 9/08; C11d 1/34
U.S. Cl. 260—980                                    6 Claims

ABSTRACT OF THE DISCLOSURE

Phosphate esters prepared by reacting between about 1.7 and 2.5 moles of an aliphatic alcohol containing between 8 and 12 carbon atoms and 1 mol of $P_2O_5$ and then neutralizing to form the alkali metal or alkaline earth metal salt thereof may be dried to substantially dry, free flowing flaked particles that may be further particulated, if desired, and which may be used to prepare dry mix detergent formulations and the like.

---

This invention relates to novel, substantially dry, free flowing organic phosphate esters and methods for preparing same.

Organic phosphate esters derived from long chain aliphatic alcohols as well as those derived from alkylene oxide adducts of long chain aliphatic alcohols and alkyl phenols have been extensively used as surface active agents and detergents. The products are utilized both in the free acid form and as neutralized salts wherein the cations are alkali metals, alkaline earth metals, ammonium and organic amines. Representative disclosures of these compounds and methods for preparing the same are found in U.S. Pats. 2,052,029; 2,656,372; 2,701,258; 2,818,420; 2,818,421; 2,854,408; 2,867,645; 3,004,056; 3,033,889; 3,042,697 and 3,088,971.

Commercially available phosphate esters of long chain aliphatic alcohols, and ethoxylated alcohols as well, in the form of either free acids in the salts thereof, are sold as liquids, pastes, gels or waxy semi-solid materials. The physical form of these materials renders their use in dry mix formulations quite difficult. Also, the said phosphate esters in the form of pastes, gels and viscous liquids create transportation and handling problems and the availability of a substantially dry, free flowing phosphate ester surface active agent offers numerous obvious advantages.

Generally it is known to produce phosphoric acid esters by reacting aliphatic alcohols with $P_2O_5$ so as to produce a mixture of mono- and di-esters. This technique is disclosed for example, in U.S. Pat. 2,656,372. The aforesaid patent also discloses numerous salts of mixtures of esters prepared from $P_2O_5$ and $C_8$ to $C_{16}$ aliphatic alcohols. All of the metal salts whose physical state is reported therein are isolated as either pastes or waxy solids, rather than substantially dry flaked particles. It is further reported for example, in the Journal of Inorganic Nuclear Chemistry, 1959, Vol. 10, pp. 275–288, that numerous metal salts of bis-(2-ethylhexyl)-phosphoric acid were prepared and found to be waxy solids, and more specifically that sodium bis-(2-ethylhexyl)-phosphate is a grey-white waxy slush after solvent is removed from the material. Furthermore, in the Journal of the American Oil Chemists' Society, 1964, pp. 337–340, sodium di-decyl phosphate is reported as being a waxy solid upon drying a slurry of this material.

The physical state of the phosphate esters accordingly has generaly limited their usefulness in dry mix formulations.

Surprisingly and in distinct contrast to the prior art heretofore discussed, it has been discovered in accordance with this invention that the neutralized reaction product of $P_2O_5$ and aliphatic alcohols containing from about 8 to 12 carbon atoms as hereinafter fully described may be prepared in the form of a substantially dry, free flowing particle.

The novel free flowing phosphate ester particles prepared in accordance with the present invention may be readily incorporated in any of the well known dry mix detergent formulations and the like. Heretofore it was not generally possible to use the aforementioned phosphate surfactants in such formulations by simple admixture with other dry components. Furthermore, the substantially dry, free flowing form of the composition of the present invention gives rise to new applications aside from the conventional surfactant uses. Thus it has been found, for example that the novel flaked mixture of sodium 2-ethylhexyl phosphates as produced herein is an effective component for compositions utilized in stabilizing ABS (acrylinitrile - butadiene-styrene) polymeric materials when presence of water in the resin composition cannot be tolerated.

Alcohols suitable for preparing the compositions of the present inventions are those of the general formula ROH, where R represents a straight or branched chain alkyl radical containing from 8 to 12, better still from 8 to 10, carbon atoms. Illustrative of such alcohols are n-octanol, n-nonyl alcohol, n-decanol, n-undecanol, n-dodecanol as well as branched chain alcohols exemplified by 2-ethylhexanol, octanol-2,3,5,5-trimethylhexanol and 2-n-butyl octanol.

The novel compositions of the present invention may be prepared by reacting $P_2O_5$ with the suitable alcohol, neutralizing with a stoichiometric amount of an aqueous solution of suitable alkali metal or alkaline earth metal containing compounds, such as, for example, sodium hydroxide or potassium hydroxide and drying the product by conventional means. Also suitable for neutralizing are solutions containing cations of magnesium, calcium, barium, lithium and the other aforesaid alkali metal and alkaline earth metals. The mol ratio of said alcohol to $P_2O_5$ is most suitably and preferably 2 to 1. Generally the mol ratio may be from about 1.7 to about 2.5, better still from 1.8 to 2.3. At the higher mol ratios substantial quantities of unreacted alcohol will be present and will create problems in drying the neutralized product. With lower mol ratios, a dark colored and tacky product is formed after neutralization. The phosphorylation reaction is preferably carried out at about 60°–65° C. but temperatures up to about 100° C. may be employed. After phosphorylation is completed, usually after 2–3 hours, the ester is neutralized with aqueous sodium hydroxide or other suitable compound and dried using conventional techniques. The drying procedure may encompass spray drying, roller drying and the like, but drum drying has been found to be the preferred method for isolating the flaked, solid salt. The moisture content of the dried salt is generally less than about 2% by weight and preferably less than about 1% by weight.

The following examples are illustrative of the practice of the present invention but are not to be considered as limitative of its scope.

EXAMPLE I

To 1938 grams of 2-ethylhexanol (14.8 mols) was added with agitation about 1062 grams of $P_2O_5$ (7 mols) at a temperature of 60–65° C. The reaction was completed after 2½ hours as indicated by a free 2-ethylhexanol analysis of less than 0.4% by weight. In its free acid form, the ester was a light brown colored liquid. The product was neutralized with a stoichiometric quantity of aqueous NaOH solution and then drum dried. The dried salt was in the form of free flowing, white flakes with a moisture content of less than 0.9% by weight.

The product is useful as a low-foaming surfactant and a 1% solution has a surface tension of 24.3 dynes/cm. and an interfacial tension of 0.8 dyne/cm.

Ross-Miles foam test of a 0.1% solution showed an initial foam of 15 mm. and after 5 minutes 1 mm. in water of 50 p.p.m. hardness at 25° C.

EXAMPLE II 284 grams of $P_2O_5$ (2.0 mols) was added to 727 grams of decyl alcohol (4.6 mols) and the reaction mass was kept at 65° C. for about 6 hours and a free decyl alcohol analysis at this point of 1% by weight indicated completion of the reaction. The ester in the free acid form was a low melting solid (melting point 33–34° C.) having a light amber color. The product was neutralized with a stoichiometric quantity of aqueous NaOH solution and drum dried to yield dry, free-flowing particles.

What is claimed is:

1. A process for preparing phosphate esters capable of forming substantially dry, non-waxy free-flowing alkali and alkaline earth metal salts, which comprises reacting an alcohol of the formula ROH, where R is a member selected from the group consisting of straight chain and branch chain alkyl radicals containing from 8 to 12 carbon atoms, with $P_2O_5$ in a molar ratio of between about 1.7 to about 2.5 mols of said alcohol to one mol of $P_2O_5$, at a temperature in the range of about 60° to about 100° C., neutralizing the phosphate ester reaction product to form the alkali metal and alkaline earth metal salts thereof and then drying said phosphate ester to form the substantially dry, non-waxy free-flowing particulate product.

2. A process according to claim 1 wherein R represents an alkyl radical having from 8 to 10 carbon atoms.

3. A process according to claim 1 wherein the molar ratio of said alcohol to $P_2O_5$ is from 1.8 to 2.3.

4. A process according to claim 1 wherein said alcohol is reacted with $P_2O_5$ at a temperature between about 60° C. and 65° C.

5. A process according to claim 1 wherein said neutralization is carried out with a member selected from the group consisting of sodium hydroxide and potassium hydroxide.

6. A process according to claim 1 wherein said phosphate ester is dried by drum drying.

References Cited

UNITED STATES PATENTS 2,849,281   8/1958   McCullough _____ 260—980X

OTHER REFERENCES

Cooper et al., "Journal American Oil Chemists," (1964), pp. 337–340.

CHARLES B. PARKER, Primary Examiner

D. R. PHILLIPS, Assistant Examiner

U.S. Cl. X.R.

252—89; 260—45.7, 963, 987